United States Patent
Lu et al.

(10) Patent No.: US 12,419,395 B2
(45) Date of Patent: Sep. 23, 2025

(54) OUTDOOR SUNSHADE WITH SUNSHADE COVER CAPABLE OF ROTATING 360 DEGREES

(71) Applicant: Zhejiang Tianji Leisure Products CO., LTD, Zhejiang (CN)

(72) Inventors: Shu Lu, Zhejiang (CN); Rongjie Lu, Zhejiang (CN)

(73) Assignee: Zhejiang Tianji Leisure Products CO., LTD, Zhejiang (CN)

( * ) Notice: Subject to any disclaimer, the term of this patent is extended or adjusted under 35 U.S.C. 154(b) by 220 days.

(21) Appl. No.: 18/452,586

(22) Filed: Aug. 21, 2023

(65) Prior Publication Data

US 2024/0376739 A1   Nov. 14, 2024

(30) Foreign Application Priority Data

May 12, 2023 (CN) .......................... 202321165634.3

(51) Int. Cl.
*A45B 23/00* (2006.01)

(52) U.S. Cl.
CPC ...... *A45B 23/00* (2013.01); *A45B 2023/0012* (2013.01); *A45B 2023/0037* (2013.01); *A45B 2023/0075* (2013.01)

(58) Field of Classification Search
CPC .... A45B 2023/0075; A45B 2023/0031; A45B 2017/005
See application file for complete search history.

(56) References Cited

U.S. PATENT DOCUMENTS

| | | | | |
|---|---|---|---|---|
| 3,975,050 | A * | 8/1976 | McKee | B60N 2/02 297/344.22 |
| 4,605,378 | A * | 8/1986 | Hamilton | B63H 16/04 440/102 |
| 5,374,074 | A * | 12/1994 | Smith | A61G 5/10 D12/131 |
| 6,575,182 | B2 * | 6/2003 | Tung | A45B 25/14 135/20.1 |
| 6,575,183 | B2 * | 6/2003 | Tung | A45B 25/14 135/98 |

(Continued)

FOREIGN PATENT DOCUMENTS

| CN | 202653352 | 1/2013 |
|---|---|---|
| CN | 205597351 | 9/2016 |

*Primary Examiner* — Noah Chandler Hawk
(74) *Attorney, Agent, or Firm* — JCIPRNET (57) ABSTRACT

Disclosed herein is an outdoor sunshade with a sunshade cover capable of rotating 360 degrees, the outdoor sunshade including a sunshade post, where a sunshade frame is arranged on one side of the sunshade post; the sunshade post includes an upper sunshade post and a lower sunshade post, and the upper sunshade post is in inserting fit with the lower sunshade post; a rotating mechanism is arranged between the upper sunshade post and the lower sunshade post; and the rotating mechanism includes a lock seat, a locking mechanism located on the lock seat and a locking portion configured to match the locking mechanism, the locking portion includes a plurality of locking positions, the plurality of locking positions are arranged around the sunshade post by one circle, and the locking mechanism locks the upper sunshade post and the lower sunshade post by means of the locking positions.

7 Claims, 5 Drawing Sheets

(56) References Cited

U.S. PATENT DOCUMENTS

| | | | |
|---|---|---|---|
| 6,923,193 B2* | 8/2005 | Chen | A45B 23/00 |
| | | | 135/21 |
| 7,367,858 B2* | 5/2008 | Matuska | B63H 16/04 |
| | | | 440/102 |
| 2001/0040208 A1* | 11/2001 | Li | E04H 12/2238 |
| | | | 248/519 |
| 2012/0180832 A1* | 7/2012 | Zheng | A45B 17/00 |
| | | | 135/20.1 |
| 2019/0137978 A1* | 5/2019 | Gharabegian | A45B 23/00 |
| 2020/0345114 A1* | 11/2020 | Wang | A45B 25/00 |

* cited by examiner

OUTDOOR SUNSHADE WITH SUNSHADE COVER CAPABLE OF ROTATING 360 DEGREES

CROSS-REFERENCE TO RELATED APPLICATION

This application claims the priority benefit of China application no. 202321165634.3, filed on May 12, 2023. The entirety of the above-mentioned patent application is hereby incorporated by reference herein and made a part of this specification.

TECHNICAL FIELD

The present invention relates to the technical field of outdoor umbrellas, in particular to an outdoor sunshade with a sunshade cover capable of rotating 360 degrees.

BACKGROUND

Outdoor umbrellas, used as outdoor leisure goods, are also known as sunshades, parasols, Roman umbrellas, central-post umbrellas, banana umbrellas and the like, are widely applied in leisure places such as squares, beaches, parks, courtyards and the like, and provide comfortable leisure and cooling places for people.

Existing traditional side umbrellas mainly include the Roman umbrellas, the banana umbrellas and the like, and during the actual usage processes, the positions of umbrella covers are usually required to be adjusted through rotation so as to rotate the umbrella covers. In addition, rotating chassis are usually used as existing rotating mechanisms, for example, a rotating base for a sunshade is disclosed in CN202653352U, belongs to the technical field of sunshade bases, and includes a base body and a rotating disc arranged on the base body in an inserted manner and provided with a gear, wherein a circular groove is correspondingly formed at the position where the base body is in contact with the rotating disc, large steel balls are arranged in the circular groove, and a gear locking mechanism capable of preventing, by means of the gear, the rotating disc from rotating is arranged between the base body and the rotating disc.

However, such structure is usually adapted to large outdoor umbrellas such as the Roman umbrellas and the like. The banana umbrellas are of small and exquisite structures, so that matching chassis thereof are relatively troublesome to operate, particularly, the entire chassis rotating mechanisms are complex to mount, and the costs are relatively high.

SUMMARY OF THE INVENTION

In order to solve the above-mentioned problems, the present invention aims to provide an outdoor sunshade with a sunshade cover capable of rotating 360 degrees, which has the characteristics of convenience in operation, simple structure and low cost.

The technical problems can be solved by the present invention through the following technical solution:

the outdoor sunshade with a sunshade cover capable of rotating 360 degrees comprises a sunshade post, where a sunshade frame is arranged on one side of the sunshade post; the sunshade post comprises an upper sunshade post and a lower sunshade post, and the upper sunshade post is in inserting fit with the lower sunshade post; a rotating mechanism is arranged between the upper sunshade post and the lower sunshade post; and the rotating mechanism comprises a lock seat, a locking mechanism located on the lock seat and a locking portion configured to match the locking mechanism, the locking portion comprises a plurality of locking positions, the plurality of locking positions are arranged around the sunshade post by one circle, and the locking mechanism locks the upper sunshade post and the lower sunshade post by means of the locking positions.

Any one of the lock seat and the locking portion is located on the upper sunshade post, and the other one is located on the lower sunshade post.

The lock seat comprises a lock seat body and a locking seat arranged on one side of the lock seat body, a sunshade post groove is formed in the lock seat body, and the locking seat is configured to match the locking mechanism for mounting.

The locking mechanism comprises a button member, a lock pin and a reset member, the button member matches the locking seat in an articulated manner by means of an articulated shaft, the button member is configured to be mounted at and match one end of the lock pin, a lock pin hole is formed in the locking seat, the lock pin hole is in communication with the sunshade post groove, and the lock pin can penetrate through the lock pin hole to extend towards the sunshade post.

The lock seat is configured to match the lower sunshade post for mounting, an upper portion of the lower sunshade post is configured to match the sunshade post groove for mounting, an annular limiting platform is arranged at an upper portion of the sunshade post groove, the middle of the annular limiting platform is a sunshade post butt-joint groove, a lower portion of the upper sunshade post penetrates through the sunshade post butt-joint groove to extend into an inner cavity of the upper portion of the lower sunshade post, and the lower portion of the upper sunshade post overlaps the upper portion of the lower sunshade post in a partially embedded manner.

A locking hole is formed in the lower sunshade post, the locking hole correspondingly matches the lock pin hole, and the locking portion is located on the upper sunshade post; and when any one of the locking positions of the locking portion is aligned to the locking hole, the lock pin can penetrate through the lock pin hole and the locking hole to match the locking position in a locked manner.

The locking positions are lock holes, and the lock holes are arranged in a circumferential direction of the upper sunshade post.

The locking positions are lock teeth, and the lock teeth are arranged in a circumferential direction of the upper sunshade post.

An oblique rod seat is arranged on the upper sunshade post in a matching manner, an oblique rod is articulated to the oblique rod seat, the other end of the oblique rod matches a rocker shell in an articulated manner, a hanging rod matches the rocker shell, a top seat is mounted on the hanging rod in a sleeved manner, a lower portion of the top seat matches the upper sunshade post in an articulated manner, and the sunshade frame matches the other end of the hanging rod.

The sunshade post is a cylindrical sunshade post.

Compared with the prior art, the present invention has the beneficial effects as follows: with regard to the present invention, the rotating mechanism is designed in an optimized manner, and the rotating mechanism designed in the optimized manner matches between the upper sunshade post and the lower sunshade post; the locking mechanism matches the locking portion to achieve the rotation operation of the upper sunshade post; and the entire outdoor sunshade is convenient to operate, simple and effective in structure and relatively low in manufacturing cost.

The features of the present invention can be clearly understood by referring to drawings of this case and detailed description of following preferred embodiments.

DETAILED DESCRIPTION OF THE EMBODIMENTS

In order to make the technical means, creative features, achievement goals and effects achieved by the present invention easy to understand, the present invention will be further described below in conjunction with specific illustrations.

As shown in FIGS. 1-10, this embodiment discloses an outdoor sunshade with a sunshade cover capable of rotating 360 degrees, the outdoor sunshade including a sunshade post 100, where the sunshade post 100 is preferably a cylindrical sunshade post; a sunshade frame 800 is arranged on one side of the sunshade post 100 and is preferably a banana umbrella product; an oblique rod seat 300 is arranged on an upper sunshade post 110 in a matching manner, an oblique rod 400 is articulated to the oblique rod seat 300, the other end of the oblique rod 400 matches a rocker shell 500 in an articulated manner, a parachute cord pulley is usually arranged in the rocker shell 500 in a matching manner, a parachute cord matches the parachute cord pulley, the rocker shell 500 matches a rocker handle to operate the parachute cord pulley, a hanging rod 700 matches the rocker shell 500, a top seat 600 is mounted on the hanging rod 700 in a sleeved manner, a lower portion of the top seat 600 matches the upper sunshade post 110 in an articulated manner, and the sunshade frame 800 matches the other end of the hanging rod 700.

The sunshade post 100 includes the upper sunshade post 110 and a lower sunshade post 120, and the upper sunshade post 110 is in inserting fit with the lower sunshade post 120; a rotating mechanism 200 is arranged between the upper sunshade post 110 and the lower sunshade post 120; the rotating mechanism 200 includes a lock seat 220, a locking mechanism 230 located on the lock seat 220 and a locking portion 210 configured to match the locking mechanism 230, the locking portion 210 includes a plurality of locking positions, the plurality of locking positions are arranged around the sunshade post 100 by one circle, and the locking mechanism 230 locks the upper sunshade post 110 and the lower sunshade post 120 by means of the locking positions; during usage operation, when the locking mechanism 230 and the locking positions are in unlocked states, the upper sunshade post 110 and the lower sunshade post 120 are in free states, the lower sunshade post 120 is usually in a fixed state due to the fact that a bottom portion fixedly matches a base, the upper sunshade post 110 can rotate relative to the lower sunshade post 120, the upper sunshade post 110 drives the sunshade frame 800 to rotate, and a rotating position can be determined according to the locking positions at different positions; and when the position of the sunshade frame 800 needs to be determined, the locking mechanism 230 matches the locking position at the corresponding position in a locked manner so as to lock the upper sunshade post 110 and the lower sunshade post 120.

Any one of the lock seat 220 and the locking portion 210 is located on the upper sunshade post 110, and the other one is located on the lower sunshade post 120.

Figure 10:
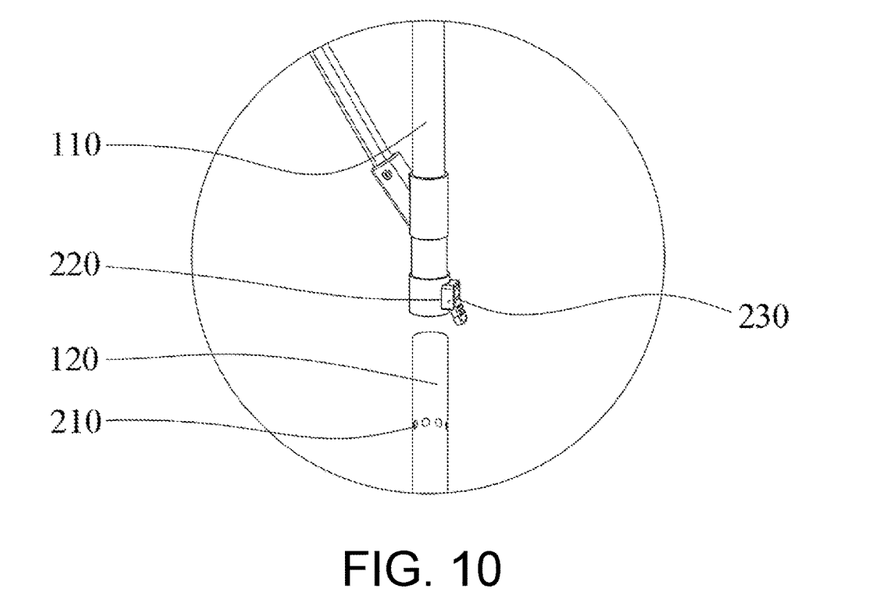
FIG. 10 is a fourth schematic diagram of the mounted structure of the upper sunshade post, the lower sunshade post and the rotating mechanism of the present invention.

In conjunction with the above description, in one preferred embodiment, as shown in FIG. 10, the lock seat 220 is located on the lower sunshade post 120, the locking portion 210 is located on the upper sunshade post 110, the lock seat 220 includes a lock seat body 221 and a locking seat 222 arranged on one side of the lock seat body 221, a sunshade post groove 225 is formed in the lock seat body 221, and the locking seat 222 is configured to match the locking mechanism 230 for mounting.

The locking mechanism 230 includes a button member 231, a lock pin 233 and a reset member 234; the button member 231 matches the locking seat 222 in an articulated manner by means of an articulated shaft 23, thereby facilitating the reciprocating movement of the button member 231; the button member 231 is configured to be mounted at and match one end of the lock pin 233 and is usually located at an upper portion of the button member 231; the button member 231 matches the reset member 234, the reset member 234 is usually a component such as a torsion spring, a reset spring and the like, one end of the reset member 234 usually matches a side wall of the locking seat 222 in an abutting manner, and the other end thereof matches the button member 231 in an abutting manner, such that the button member 231 is usually kept in a locked state; a lock pin hole 223 is formed in the locking seat 222, the lock pin hole 223 is in communication with the sunshade post groove 225, and the lock pin 233 can penetrate through the lock pin hole 223 to extend towards the sunshade post 100; by means of the reset member 234, the button member 231 usually enables the other end of the lock pin 233 to penetrate through the lock pin hole 223 to fixedly match the locking position; and when the button member 231 is pressed, by means of a seesaw operation of the button member 231, the lock pin 233 is driven to extend outwards, thereby separating the lock pin 233 and the locking position, achieving locking separation of the upper sunshade post 110 and the lower sunshade post 120, and facilitating a user completing a rotation operation.

The lock seat 220 is configured to match the lower sunshade post 120 for mounting, an upper portion of the lower sunshade post 120 is configured to match the sunshade post groove 225 for mounting, an annular limiting platform 224 is arranged at an upper portion of the sunshade post groove 225, the middle of the annular limiting platform 224 is a sunshade post butt-joint groove 226, the annular limiting platform 224 is usually arranged at a port of the upper portion of the lower sunshade post 120 in an abutting manner, a lower portion of the upper sunshade post 110 penetrates through the sunshade post butt-joint groove 226 to extend into an inner cavity of the upper portion of the lower sunshade post 120, and the lower portion of the upper sunshade post 110 overlaps the upper portion of the lower sunshade post 120 in a partially embedded manner; a locking hole 130 is formed in the lower sunshade post 120, the locking hole 130 correspondingly matches the lock pin hole 223, and the locking portion 210 is located on the upper sunshade post 110; and when any one of the locking positions of the locking portion 210 is aligned to the locking hole 130, the lock pin 233 can penetrate through the lock pin hole 223 and the locking hole 130 to match the locking position in a locked manner.

Figure 1:
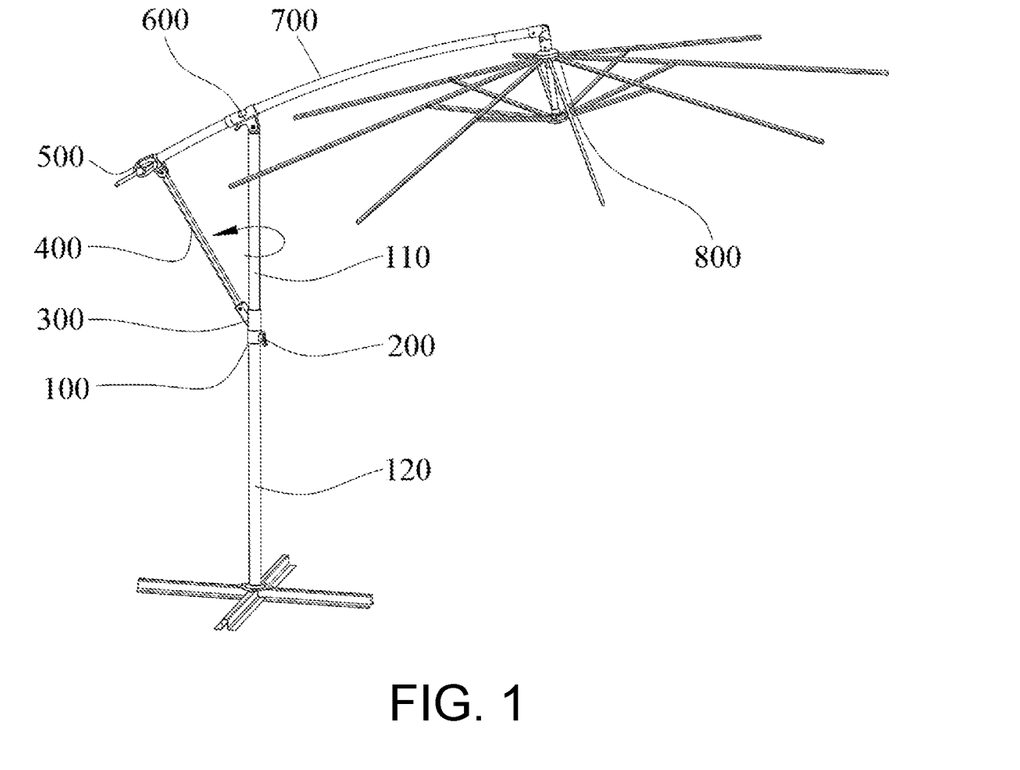
FIG. 1 is a schematic diagram of an overall structure of the present invention.
Figure 2:
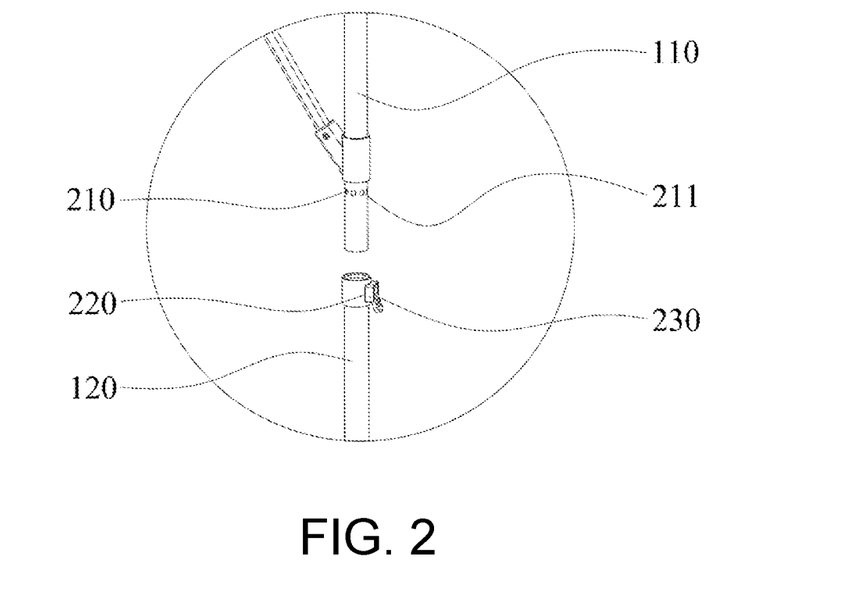
FIG. 2 is a first schematic diagram of a mounted structure of an upper sunshade post, a lower sunshade post and a rotating mechanism of the present invention.
Figure 3:
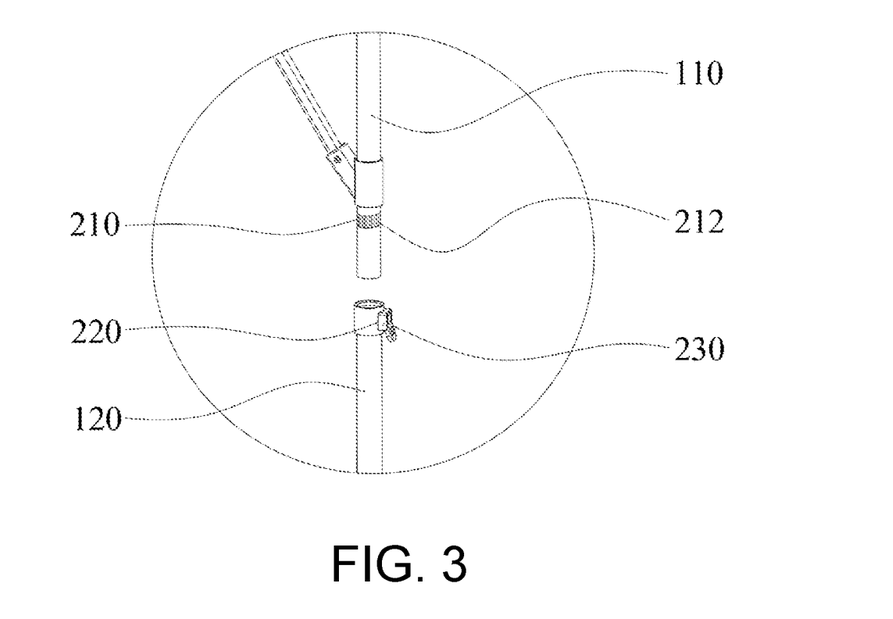
FIG. 3 is a second schematic diagram of the mounted structure of the upper sunshade post, the lower sunshade post and the rotating mechanism of the present invention.
Figure 4:
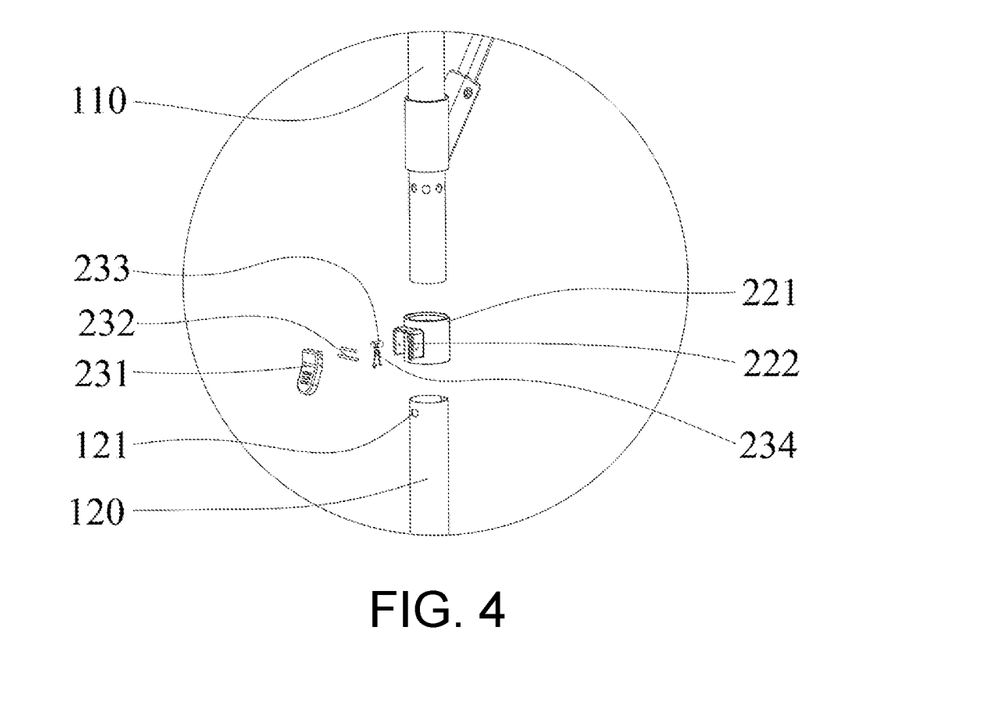
FIG. 4 is a third schematic diagram of the mounted structure of the upper sunshade post, the lower sunshade post and the rotating mechanism of the present invention.
Figure 5:
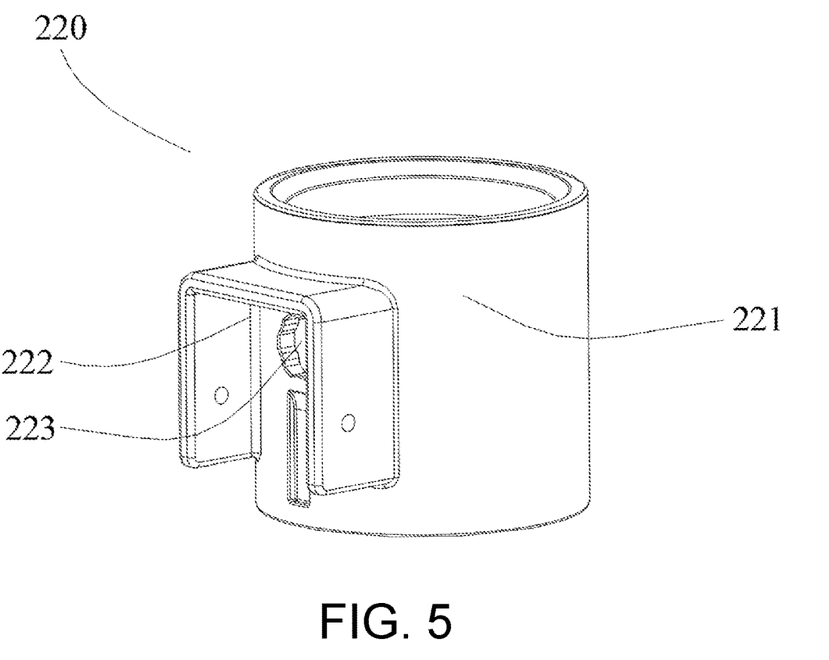
FIG. 5 is a structure diagram of a lock seat of the present invention.
Figure 6:
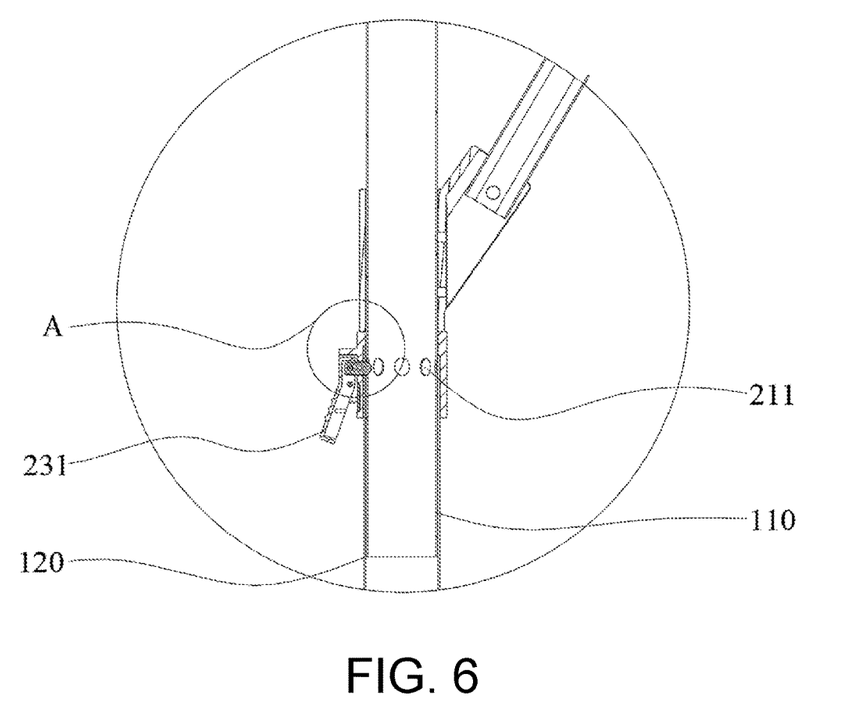
FIG. 6 is a schematic diagram of a sectional structure of the upper sunshade post, the lower sunshade post and the rotating mechanism of the present invention.
Figure 7:
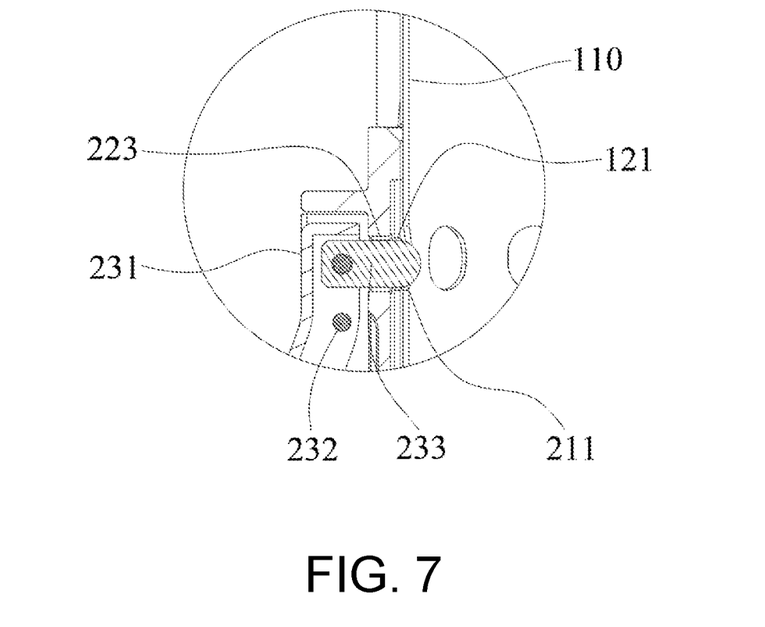
FIG. 7 is a partial enlarged structure diagram at A in FIG. 6 of the present invention.
Figure 8:
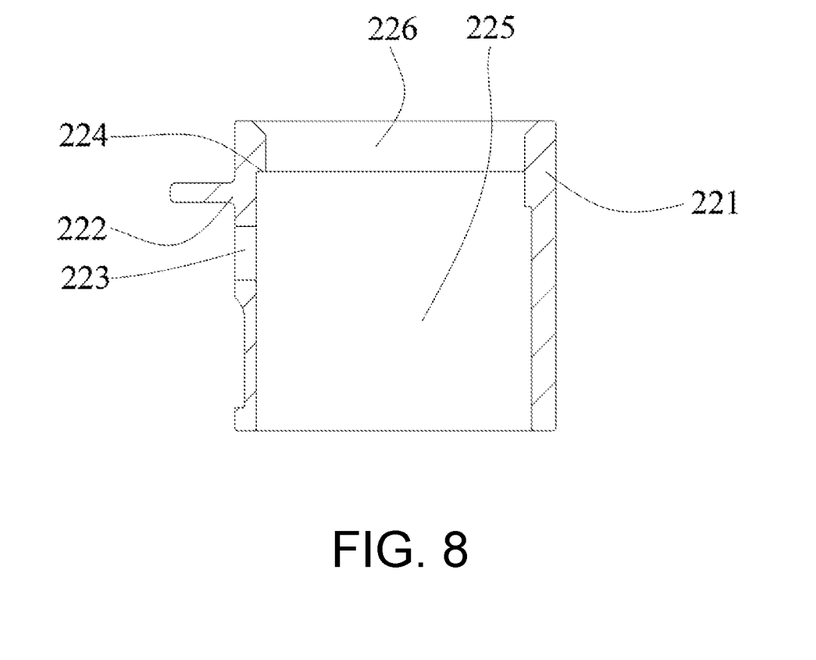
FIG. 8 is a schematic diagram of a sectional structure of the lock seat of the present invention.
Figure 9:
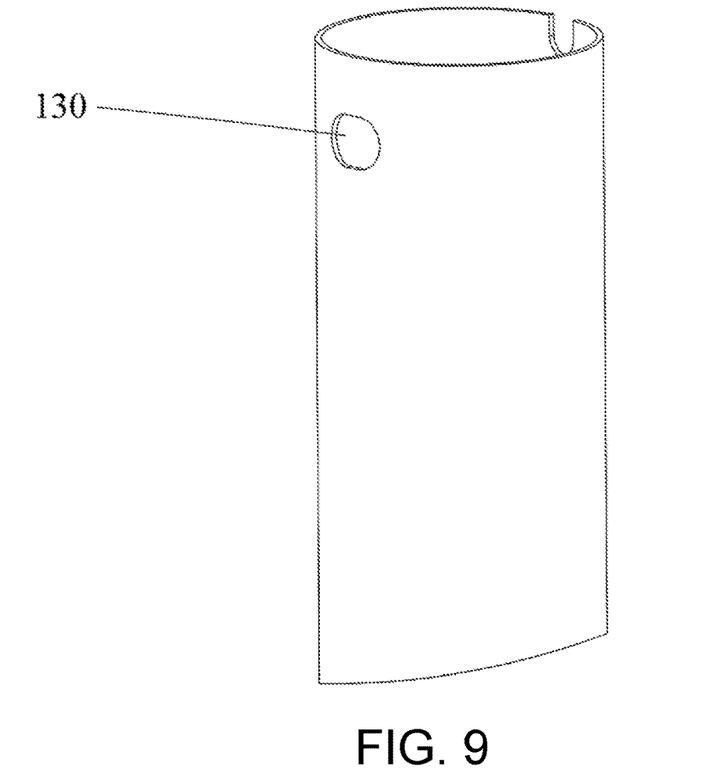
FIG. 9 is a structure diagram of a locking hole of the present invention.

In conjunction with the above description, in one preferred embodiment, as shown in FIGS. 2-4, the lock seat 220 is located on the upper sunshade post 110, the locking portion 210 is located on the lower sunshade post 120, the lock seat 220 includes a lock seat body 221 and a locking seat 222 arranged on one side of the lock seat body 221, a sunshade post groove 225 is formed in the lock seat body 221, the locking seat 222 is configured to match the locking mechanism 230 for mounting, and the operation of the locking mechanism 230 is the same as that in the above embodiment.

The lock seat 220 is configured to match the upper sunshade post 110 for mounting and is usually located at a lower end of the upper sunshade post 110, and the lock seat 220 fixedly matches the lower end of the upper sunshade post 110; a lower portion of the upper sunshade post 110 is configured to match the sunshade post groove 225 for mounting, an annular limiting platform 224 is arranged at a lower portion of the sunshade post groove 225, the middle of the annular limiting platform 224 is a sunshade post butt-joint groove 226, the annular limiting platform 224 is usually arranged at a port of the lower portion of the upper sunshade post 110 in an abutting manner, an upper portion of the lower sunshade post 120 penetrates through the sunshade post butt-joint groove 226 to extend into an inner cavity of the lower portion of the upper sunshade post 110, and the upper portion of the lower sunshade post 120 overlaps the lower portion of the upper sunshade post 110 in a partially embedded manner; a locking hole 130 is formed in the upper sunshade post 110, the locking hole 130 correspondingly matches the lock pin hole 223, and the locking portion 210 is located on the lower sunshade post 120; and when any one of the locking positions of the locking portion 210 is aligned to the locking hole 130, the lock pin 233 can penetrate through the lock pin hole 223 and the locking hole 130 to match the locking position in a locked manner.

In conjunction with the above description, in one preferred embodiment, as shown in FIG. 2, the locking positions are lock holes 211, the lock holes 211 are arranged in a circumferential direction of the upper sunshade post 100, there are 2-12 lock holes 211, preferably 4, 6 or 8 lock holes, and the lock holes 211 are arranged at equal intervals according to the circumference of 360 degrees.

In conjunction with the above description, in one preferred embodiment, as shown in FIG. 3, the locking positions are lock teeth 212, and the lock teeth 212 are arranged in a circumferential direction of the upper sunshade post 100, the lock teeth 212 form a lock tooth ring to facilitate meshing fitting with the lock pin 233, and an end portion of the lock pin 233 is usually of a tooth-shaped structure and is configured to match the lock teeth for locking.

With regard to the present invention, the rotating mechanism is designed in an optimized manner, and the rotating mechanism designed in the optimized manner matches between the upper sunshade post and the lower sunshade post; the locking mechanism matches the locking portion to achieve the rotation operation of the upper sunshade post; and the entire outdoor sunshade is convenient to operate, simple and effective in structure and relatively low in manufacturing cost.

The above description is only the preferred embodiment of the present invention, and is not intended to limit the present invention in any way. Any simple amendment, equivalent change, or modification made to the above embodiment in accordance with the technical principles of the present invention still falls within the scope of the technical solution of the present invention.

What is claimed is:

1. An outdoor sunshade with a sunshade cover capable of rotating 360 degrees, the outdoor sunshade comprising a sunshade post, wherein a sunshade frame is arranged on one side of the sunshade post; the sunshade post comprises an upper sunshade post and a lower sunshade post, and the upper sunshade post is in inserting fit with the lower sunshade post; a rotating mechanism is arranged between the upper sunshade post and the lower sunshade post; and the rotating mechanism comprises a lock seat, a locking mechanism located on the lock seat and a locking portion configured to match the locking mechanism, the locking portion comprises a plurality of locking positions, the plurality of locking positions are arranged around the sunshade post by one circle, and the locking mechanism locks the upper sunshade post and the lower sunshade post by means of the locking positions, wherein any one of the lock seat and the locking portion is located on the upper sunshade post, and the other one is located on the lower sunshade post, wherein the lock seat comprises a lock seat body and a locking seat arranged on one side of the lock seat body, a sunshade post groove is formed in the lock seat body, and the locking seat is configured to match the locking mechanism for mounting, wherein the locking mechanism comprises a button member, a lock pin and a reset member, the button member matches the locking seat in an articulated manner by means of an articulated shaft, the button member is configured to be mounted at and match one end of the lock pin, a lock pin hole is formed in the locking seat, the lock pin hole is in communication with the sunshade post groove, and the lock pin can penetrate through the lock pin hole to extend towards the sunshade post.

2. The outdoor sunshade with a sunshade cover capable of rotating 360 degrees according to claim 1, wherein the lock seat is configured to match the lower sunshade post for mounting, an upper portion of the lower sunshade post is configured to match the sunshade post groove for mounting, an annular limiting platform is arranged at an upper portion of the sunshade post groove, the middle of the annular limiting platform is a sunshade post butt-joint groove, a lower portion of the upper sunshade post penetrates through the sunshade post butt-joint groove to extend into an inner cavity of the upper portion of the lower sunshade post, and the lower portion of the upper sunshade post overlaps the upper portion of the lower sunshade post in a partially embedded manner.

3. The outdoor sunshade with a sunshade cover capable of rotating 360 degrees according to claim 2, wherein a locking hole is formed in the lower sunshade post, the locking hole correspondingly matches the lock pin hole, and the locking portion is located on the upper sunshade post; and when any one of the locking positions of the locking portion is aligned to the locking hole, the lock pin can penetrate through the lock pin hole and the locking hole to match the locking position in a locked manner.

4. The outdoor sunshade with a sunshade cover capable of rotating 360 degrees according to claim 3, wherein the locking positions are lock holes, and the lock holes are arranged in a circumferential direction of the upper sunshade post.

5. The outdoor sunshade with a sunshade cover capable of rotating 360 degrees according to claim 3, wherein the locking positions are lock teeth, and the lock teeth are arranged in a circumferential direction of the upper sunshade post.

6. The outdoor sunshade with a sunshade cover capable of rotating 360 degrees according to claim 3, wherein an oblique rod seat is arranged on the upper sunshade post in a matching manner, an oblique rod is articulated to the oblique rod seat, the other end of the oblique rod matches a rocker shell in an articulated manner, a hanging rod matches the rocker shell, a top seat is mounted on the hanging rod in a sleeved manner, a lower portion of the top seat matches the upper sunshade post in an articulated manner, and the sunshade frame matches the other end of the hanging rod.

7. The outdoor sunshade with a sunshade cover capable of rotating 360 degrees according to claim 6, wherein the sunshade post is a cylindrical sunshade post.

\* \* \* \* \*